United States Patent [19]
Ohzawa

[11] Patent Number: 6,118,501
[45] Date of Patent: Sep. 12, 2000

[54] PROJECTION DISPLAY APPARATUS HAVING PREDETERMINED CONDITIONS TO CORRECT DISTORTIONS

[75] Inventor: Soh Ohzawa, Toyonaka, Japan

[73] Assignee: Minolta Co., Ltd., Osaka, Japan

[21] Appl. No.: 09/360,196

[22] Filed: Jul. 23, 1999

[30] Foreign Application Priority Data

Jul. 23, 1998 [JP] Japan ................................ 10-208169

[51] Int. Cl.[7] .......................... G02F 1/1335; G03B 21/00
[52] U.S. Cl. ..................................... 349/5; 349/8; 353/69
[58] Field of Search ................................ 349/5, 7, 8, 9; 353/69, 70, 100, 101, 102

[56] References Cited

U.S. PATENT DOCUMENTS

| | | | |
|---|---|---|---|
| 5,475,534 | 12/1995 | Okajima et al. | 359/649 |
| 5,709,445 | 1/1998 | Takamoto | 353/70 |
| 5,871,266 | 2/1999 | Negishi et al. | 353/98 |
| 5,947,576 | 9/1999 | Sato et al. | 353/70 |
| 5,986,806 | 11/1999 | Sugaware | 359/557 |
| 5,999,335 | 12/1999 | Koyama et al. | 359/738 |

FOREIGN PATENT DOCUMENTS

| | | |
|---|---|---|
| 5-119283 | 5/1993 | Japan . |
| 5-134213 | 5/1993 | Japan . |
| 6-186496 | 7/1994 | Japan . |
| 7-151994 | 6/1995 | Japan . |

*Primary Examiner*—William L. Sikes
*Assistant Examiner*—Mike Qi
*Attorney, Agent, or Firm*—Sidley & Austin

[57] ABSTRACT

A projection display apparatus has a reflective type display for displaying a two-dimensional image on a display surface, a projection optical system for projecting an enlargement image of the two-dimensional image displayed on the display surface onto a projection image surface, the projection optical system having a diaphragm and a decentering optical element disposed between the diaphragm and the reflective type display and decentered with respect to the diaphragm, and wherein the predetermined conditions are satisfied when an image center ray is defined by a line connecting a center position of the display surface and the center position of the projection image surface.

14 Claims, 10 Drawing Sheets

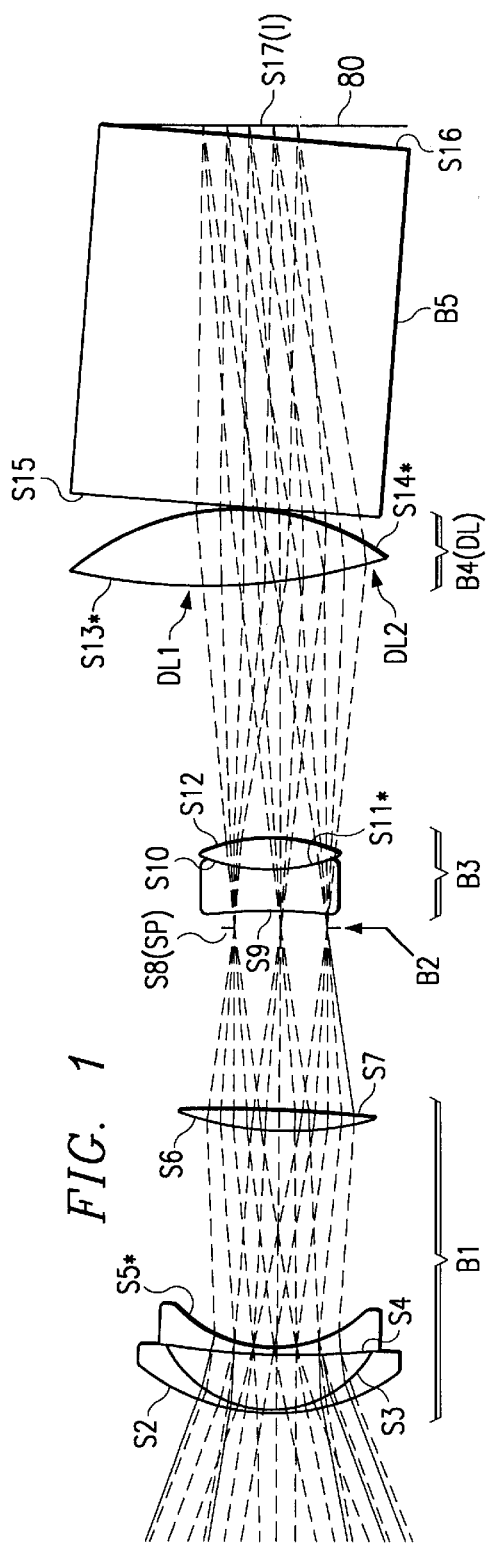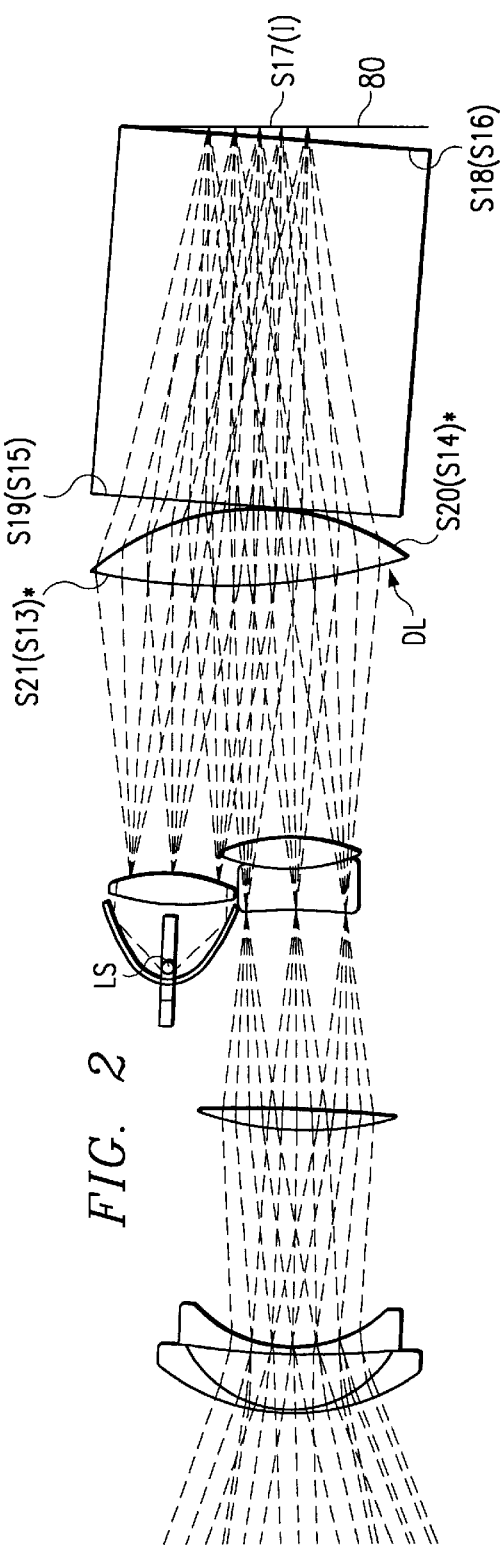

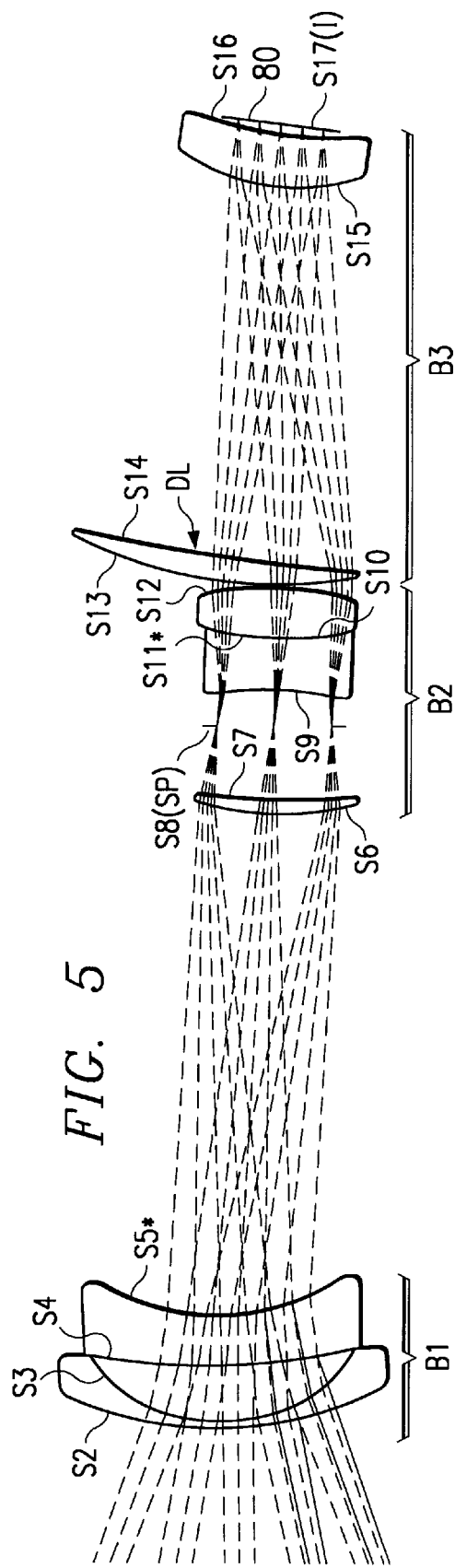
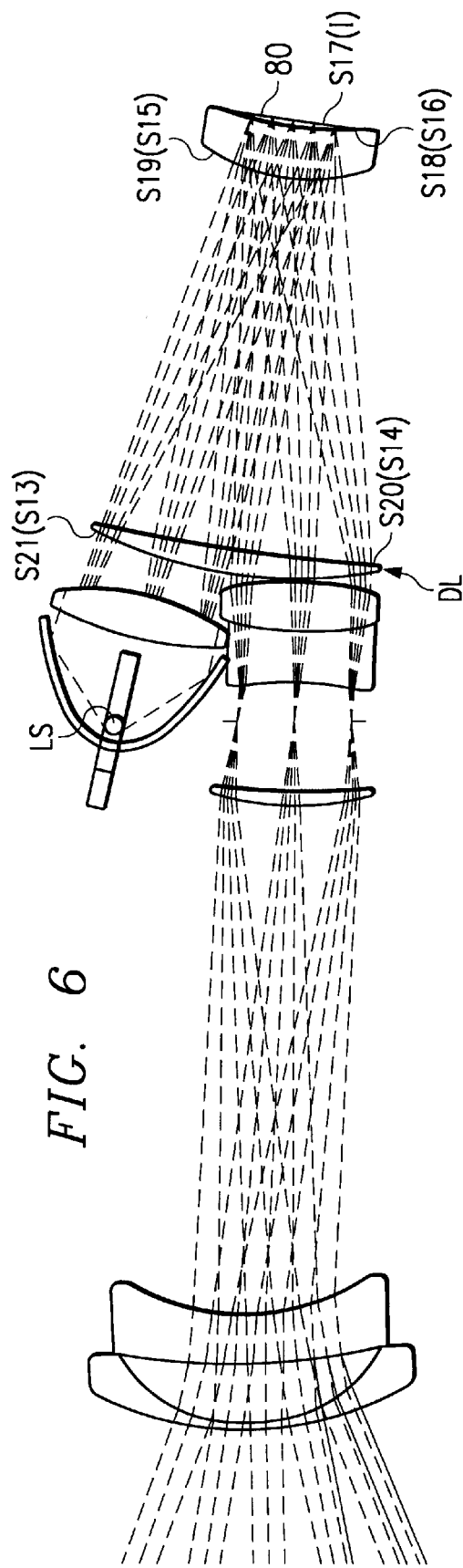
FIG. 5
FIG. 6

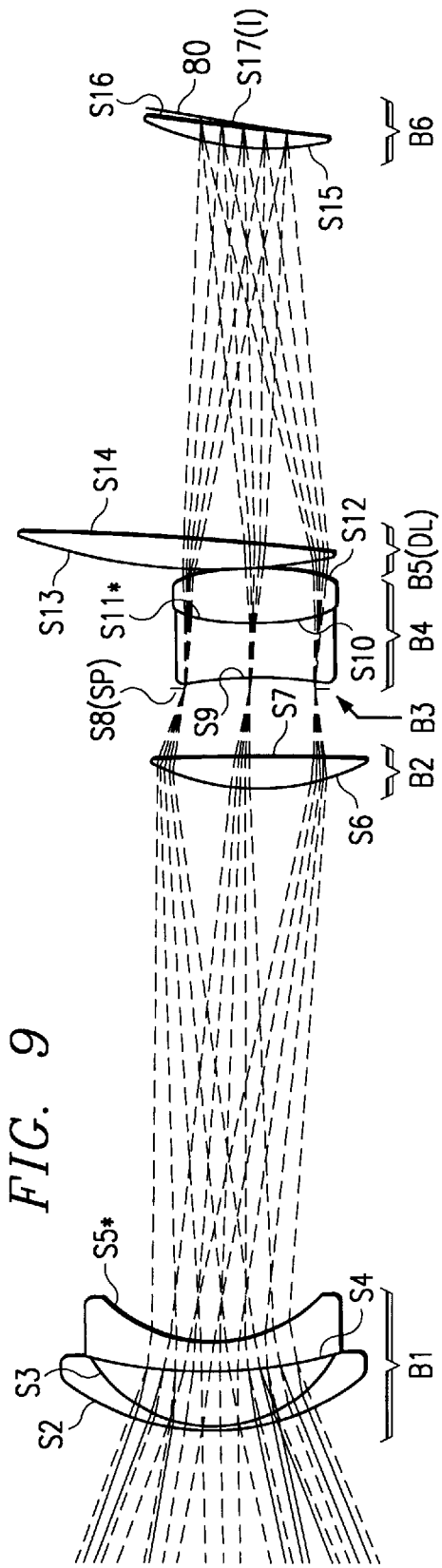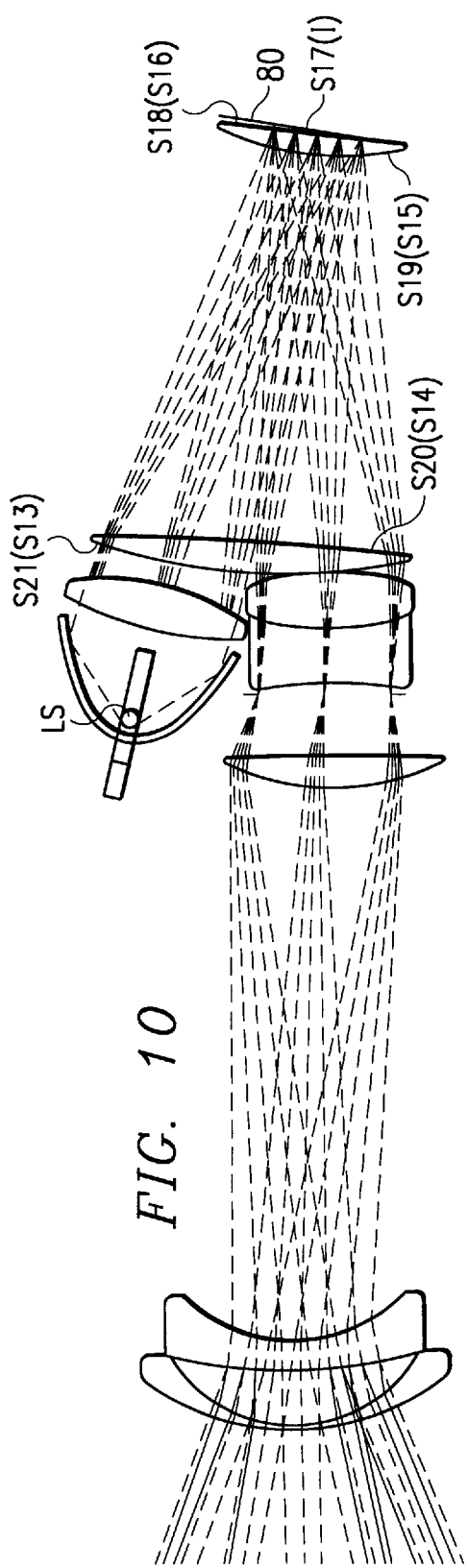

PROJECTION DISPLAY APPARATUS HAVING PREDETERMINED CONDITIONS TO CORRECT DISTORTIONS

CROSS-REFERENCE TO RELATED APPLICATIONS

This application is based on Application No. 10-208169 filed in Japan, the content of which is hereby incorporated by reference.

FIELD OF THE INVENTION

The present invention relates to a projection display apparatus, and specifically relates to a compact, high resolution projection display apparatus for projecting on a screen a two-dimensional image of a reflective type display element {e.g., a reflective liquid crystal display (LCD) or a digital micro mirror (DMD)}.

DESCRIPTION OF THE RELATED ART

Recently, attention has been focused on reflective liquid crystal displays (LCD) which have a higher light usage efficiency than transmission type LCD. The reflective type LCD reflects the entering illumination light from its surface, and emits regular reflection projection light having the same reflection angle but opposite sign as the incidence angle. A projection display apparatus using a reflective LCD has been proposed, wherein a reflective LCD is illuminated from a near perpendicular direction, and the projection light emitted in a perpendicular direction forms an image on a screen via a projection optical system.

FIG. 13 shows a conventional example of a single-panel projection display apparatus using a reflective LCD. The illumination light emitted from a light source 1 is reflected by a reflector 2, and subsequently enters a collimator 3. The collimator 3 improves the efficiency of the reflective LCD 5, and is an illumination optical system providing even illumination. The illumination light transmitted through the collimator 3 enters a polarization beam splitter 4. The polarization surface of the polarization beam splitter 4 reflects only the S light flux component, which enters the reflective LCD 5 at a right angle. The illumination light which enters the reflective LCD 5 at a right angle is selectively converted by the polarization surface to a P light flux component for each pixel by the reflective LCD 5. This component is reflected in regular reflection as projection light. The projection light reflected as regular reflection from the reflective LCD 5 in a perpendicular direction passes through the polarization beam splitter 4 without reflection, and forms an image on a screen 7 via a projection optical system 6.

FIG. 14 shows a conventional example of a three-panel projection display apparatus using a reflective LCD. Illumination light emitted from a light source 11 and reflected by a reflector 12 and a mirror 13 is transmitted through a first lens array 14, and subsequently passes through a polarization separation prism 19 comprising a rectangular prism 15 and a parallel plane table 16. Reference number 17 refers to the total reflective surface, and reference number 18 refers to the polarization separation surface. The illumination light passing through the polarization separation prism 19 passes through the polarization surface of 1/2 wavelength panel 20, then passes through a second lens array 21 and an overlaid lens 22, then passes through an illumination relay optical system 23. The co-axial system of the projection optical system 38 comprises the posterior part 26 of the projection optical system, a diaphragm SP, and the anterior part 25 of the projection optical system. The illumination light 36 passing through the illumination relay optical system 23 is reflected by a reflecting mirror 24 disposed in proximity to the diaphragm SP, and passes through the anterior part 25 of the projection optical system.

The illumination light 36 passing through the anterior part 25 of the projection optical system is color separated by cross dichroic prism 27, and after passing through the polarization plates 33~35, enters the red, green, blue reflective LCDs 28~30. Reference number 31 refers to a red reflective surface, and reference number 32 refers to a blue reflective surface. The light reflected by the reflective LCDs 28~30 becomes the projection light via color combination by the cross dichroic prism 27, which passes through the diaphragm SP position lacking the reflective mirror 24, and forms an image on a screen (not shown in the drawing).

In the case of the conventional example shown in FIG. 13, a device is required to separate the illumination optical path and the projection optical path as performed by the polarization beam splitter 4 because the illumination light and the projection light travel on virtually the same optical path. A separation device such as the polarization beam splitter 4 becomes a factor in cost increases because to manufacture such a separation device requires the processing of a large glass block or multi-layer thin film process. Since the reflective LCD 5 transmits and blocks light rays from the polarization surface, disturbances arise in the polarization surface due to irregularities of the medium within the glass block, such that unnecessary light components are transmitted therethrough and reduce the contrast of the projected image.

In the case of the conventional example shown in FIG. 14, the F number required in the projection optical system 38 must be doubled for using the illumination light 36 and the projection light 37. Accordingly, the number of lens elements must be increased and the lens diameter must be increased to maintain the projection efficiency, and these are factors in cost increase and scale enlargement of the device.

SUMMARY OF THE INVENTION

A main object of the present invention is to provide an improved projection display apparatus.

Another object of the present invention is to provide a high resolution projection display apparatus at low cost.

Yet another object of the present invention is to provide a compact projection display apparatus at low cost.

These objects are attained by a projection display apparatus comprising a reflective type display for displaying a two-dimensional image on a display surface, a projection optical system for projecting an enlargement image of the two-dimensional image displayed on the display surface onto a projection image surface, the projection optical system having a diaphragm and a decentering optical element disposed between the diaphragm and the reflective type display and decentered with respect to the diaphragm, and wherein the following conditions are satisfied when an image center ray is defined by a line connecting a center position of the display surface and the center position of the projection image surface;

$\theta_i < 10°$ $5° < \theta_o < 15°$ where $\theta_i$ represents an angle formed by a normal line of the projection image surface and the image center ray, and $\theta_o$ represents an angle formed by the normal line of the display surface and the image center ray.

BRIEF DESCRIPTION OF THE DRAWINGS

These and other objects and features of the invention will become clear from the following description taken in conjunction with the preferred embodiments with reference to the accompanying drawings, in which:

FIG. 1 shows the construction of the projection optical system of a first embodiment;

FIG. 2 shows the construction of the projection optical system and the illumination optical system of the first embodiment;

FIG. 5 shows the construction of the projection optical system of a second embodiment;

FIG. 6 shows the construction of the projection optical system and the illumination optical system of the second embodiment;

FIG. 9 shows the construction of the projection optical system of a third embodiment;

FIG. 10 shows the construction of the projection optical system and the illumination optical system of the third embodiment;

DESCRIPTION OF THE PREFERRED EMBODIMENTS

The projection display apparatus of the present invention is described hereinafter with reference to the accompanying drawings. FIGS. 1, 5, and 9 show the constructions of the projection optical systems of the first through third embodiments, and FIGS. 2, 6, and 10 show the constructions of the projection optical systems and the illumination optical systems of the first through third embodiments. Each optical system structural drawing shows the YZ cross sectional construction in the orthogonal coordinate system (X, Y, Z) described below.

The first through third embodiments comprise a reflective type display 80 (e.g., a reflective LCD) for displaying a two-dimensional image on a rectangular display surface (I), and a projection optical system (FIGS. 1, 5, 9) for projecting an enlarged two-dimensional image. The projection optical system of each embodiment is constructed of a plurality of blocks {Bi(i=1,2,3 . . . )}, one or more of which is decentered from a co-axial system. The projection optical system has a diaphragm SP, and a decentering optical element DL which is eccentrically larger between the diaphragm SP and the display surface I. The disposition of the decentering optical element DL which is eccentrically larger between the diaphragm SP and the display surface I allows the light flux from the display surface I to the projection optical system to be inclined relative to the normal line of the display surface I. In this way, the illumination optical system and the projection optical system can be separated.

It is desirable that the optical construction of the projection display apparatus satisfies the following conditions.

Figure 15:
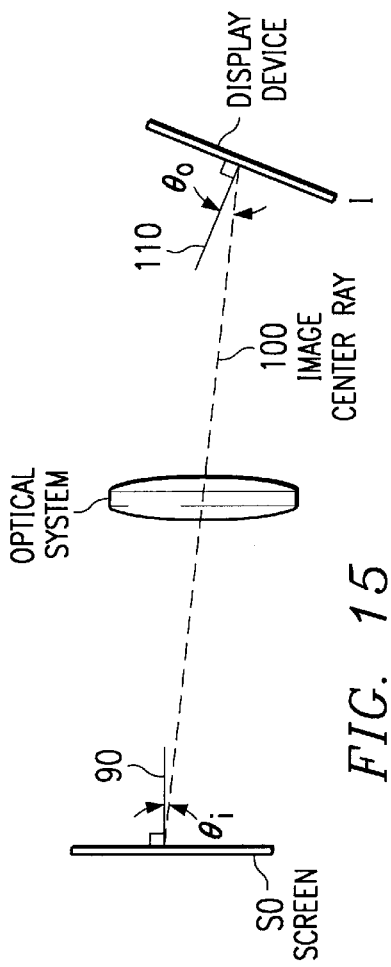
FIG. 15 is an illustration of the angles $\theta_i$ and $\theta_0$.
Figure 14:
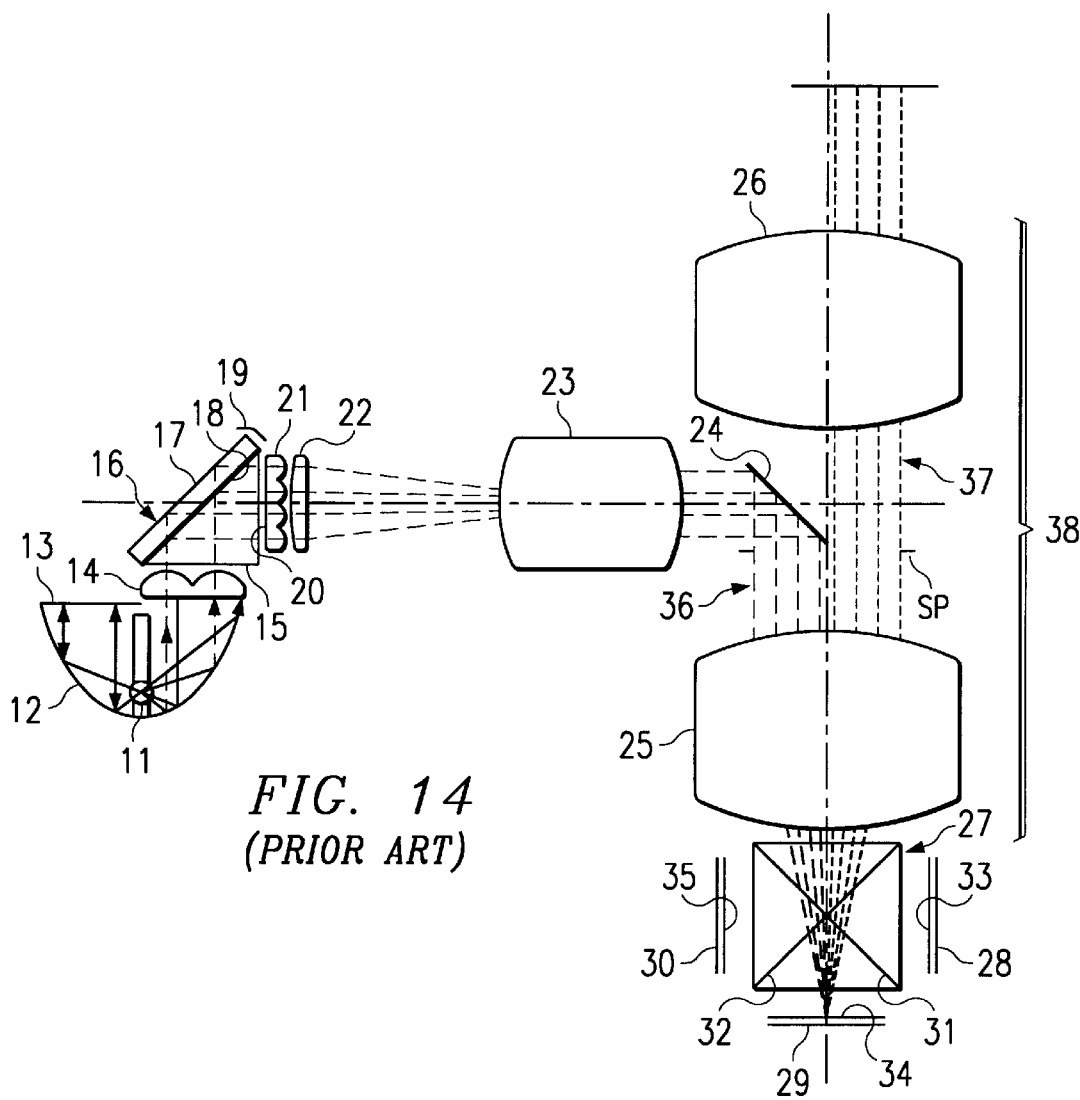
FIG. 14 shows the construction of a conventional example of a three-panel projection display apparatus.

It is desirable that conditional equations (1) and (2) below are satisfied when the light rays connecting the center position of the display surface I and the center position of the projection image plane (equivalent to the screen surface) are the image center rays.

$$\theta_i < 10° \tag{1}$$

$$5° < \theta_0 < 15° \tag{2}$$

where $\theta_i$ represents an angle formed by a normal line 90 of the projection image surface S0 and the image center ray 100, and $\theta_o$ represents an angle formed by the normal line 110 of the display surface I and the image center ray (FIG. 15).

When the value of condition (1) is outside the condition range, in order to correct trapezoidal distortion generated by the tilted projection, the number of lens elements that must be eccentric increases, thereby increasing the amount of decentering. The additional lens elements increase the manufacturing costs. When the lower limit of condition (2) is not met, the illumination optical system and the projection optical system cannot be separated. When the upper limit of condition (2) is exceeded, in order to correct trapezoidal distortion and coma aberration generated by the tilted projection, the number of lens elements that must be eccentric increases, thereby increasing the amount of decentering. The additional lens elements increase the manufacturing costs.

Figure 16:
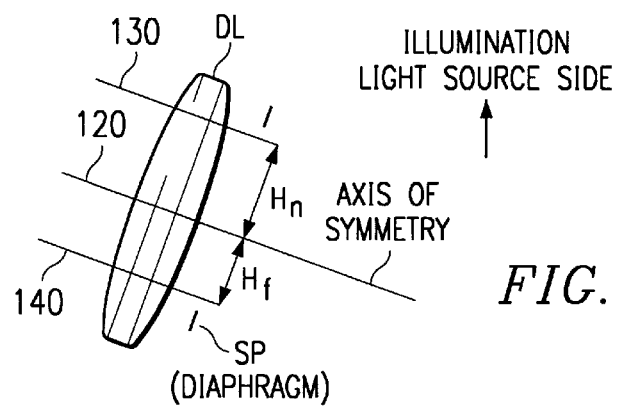
FIG. 16 is an illustration of the relationships Hn and Hf.

In the surface of the decentering optical element DL (surface S13 in the present embodiments) nearest the diaphragm SP within the decentering direction cross section (YZ plane), it is desirable that condition (3) is satisfied when the positive side is the illumination light source LS side from the axis of symmetry of the decentering optical element DL.

$$-0.15 < -Hn/Hf < 0.4 \tag{3}$$

where Hn represents the distance from the axis of symmetry 120 of the decentering optical element DL to the position 130 nearest the illumination light source LS at the projection light flux transmission position, and Hf represents the distance from the axis of symmetry 120 of the decentering optical element DL to the position 140 farthest from the illumination light source LS at the projection light flux transmission position (FIG. 16).

When the lower limit of condition (3) is not met, the decentering optical element DL becomes excessively decentering, and in order to correct distortion generated by the decentering, the number of lens elements that must have a decentering effect increases, thereby increasing the amount of decentering. When the upper limit of condition (3) is exceeded, there is insufficient decentering, thereby making is difficult to separate the illumination light flux and the projection light flux.

Figure 17:
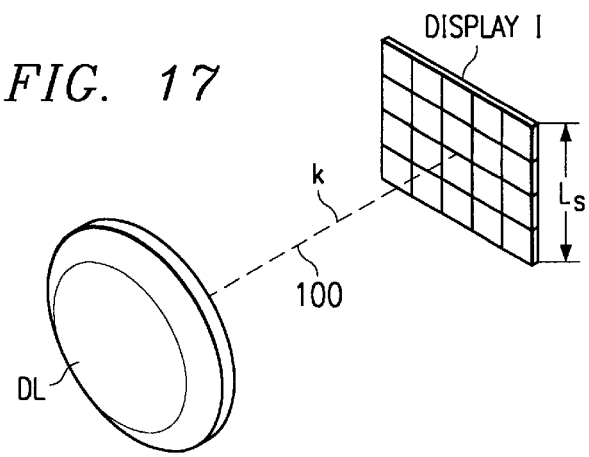
FIG. 17 is an illustration of the relationships k and Ls.

It is desirable to satisfy condition (4) by providing a space filled with a continuous medium between the decentering optical element DL and the display surface I. The space is filled with a continuous medium formed by a block B5 corresponding to the cross dichroic prism in the first embodiment, and is an empty space in the second and third embodiments.

$$1.0 < k/Ls < 10 \quad (4)$$

where k represents the distance along the image center ray 100 in the space filled with a continuous medium, and Ls represents the length of the short side of the display surface I (FIG. 17). Generally, the display surface I is a non-square, rectangular shape, because image data determines its shape (for example VGA of 600×900 pixel or XGA of 1200×800 pixel).

When the lower limit of condition (4) is not met, it becomes difficult to position the prism for color separation and color combination on the display side of the decentering optical element DL. Accordingly, the cost increases due to the need for several decentering optical elements DL for color separation and color combination since the prism for color separation and color combination is disposed on the diaphragm SP side of the decentering optical element DL. When the upper limit of condition (4) is exceeded, the cost increases and compactness is lost because the overall length of the lens increases and the lens diameter increases. It is desirable that a lens element having negative optical power is disposed on the outermost side of the projection image surface. In this way the lens back can be lengthened, and the distance k can be easily increased.

It is desirable to arrange an optical system comprising both a decentering optical element DL and an illumination optical system between the decentering optical element DL and the display, such that only the optical element B5 (or the empty space between decentering optical element DL and display surface I) and the decentering optical element DL transmit both the illumination light illuminating the display surface I and the projection light reflected by the display surface I. According to this construction, the decentering optical element DL and the optical element disposed between the decentering optical element DL and the projection image display surface I can be common members to the illumination optical system and the projection optical system. Therefore, the manufacturing costs can be reduced. Since only a simple projection light is transmitted through the projection optical system on the projection image surface side of the decentering optical element DL, the number of lens elements and the lens diameter can be reduced, thereby reducing costs.

In a projection display apparatus provided with an illumination light source LS for illuminating a display surface I as in each of the present embodiments, it is desirable that the decentering optical element DL has a positive optical power, and parallel and decentering relative to the diaphragm SP on the illumination light source LS side. According to this construction, since the principal ray from the decentering optical element DL to the display surface I approaches being telecentric, the trapezoidal distortion is readily corrected, and the lens back is easily lengthened.

Furthermore, the part DL1 of decentering optical element DL through which illumination light in the illumination opitcal system on the opposite side from the part DL2 used as the projection optical system in the decentering optical element DL can be jointly used as the collimator of the illumination optical system.

Figure 18:
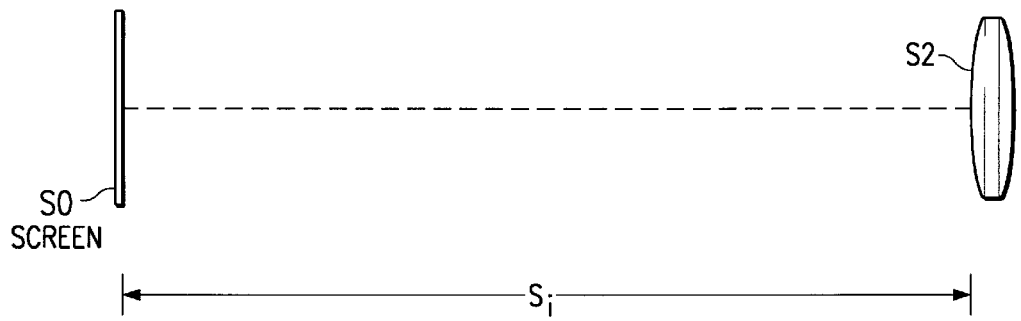
FIG. 18 is an illustration of the factor Si.
Figure 19:
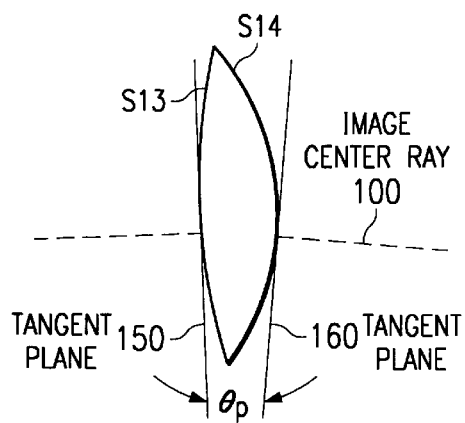
FIG. 19 is an illustration of the angle $\theta_p$.
Figure 20:
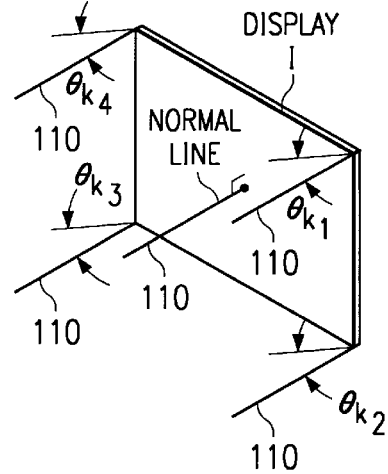
FIG. 20 is an illustration of the angles $\theta_k$.

It is desirable that the positive optical power of the decentering optical element DL satisfies condition (5).

$$0.03 < -Ph \times Si \times \beta < 0.7 \quad (5)$$

where Ph represents the positive optical power of the decentering optical element DL, Si represents the distance from the projection image surface to the surface (S2) nearest the projection image surface side of the projection optical system (see FIG. 18), and β represents the reduction magnification in the decentering direction of the decentering optical element DL.

When the lower limit of condition (5) is not met, the amount of parallel decentering becomes excessive due to the prism effect in inclined projection on the display surface I. Accordingly, the cost is increased due to necessity of increasing the diameter and the core thickness of the decentering optical element DL. When the upper limit of condition (5) is exceeded, it becomes difficult to ensure optical efficiency due to the excessive distortion generated by the decentering optical element DL, and the amount of decentering is insufficient due to the prism effect, such that it becomes difficult to join the illumination optical system and the decentering optical element DL.

It is desirable that condition 6 is satisfied as shown below.

$$2° < \theta_p < 15° \quad (6)$$

where θ represents the angle formed by the tangent plane 150 at the position at which the image center ray 100 passes through a surface (S13) of the decentering optical element DL nearest the projection image surface side (S0), and the tangent plane 160 at the position at which the image center ray passes through a surface (S14) of the decentering optical element DL nearest the display surface I side.

The prism effect of the decentering optical element DL makes it possible to obtain tilted illumination and tilted projection relative to the display surface I. When the lower limit of condition (6) is not met, it is difficult to bend the light rays at an angle required for tilted illumination, thus making it difficult to separate the illumination light and the projection light. When the upper limit of condition (6) is exceeded, the separation of the illumination light and the projection light becomes excessively large due to bending of the light rays more than is necessary. As a result, the prism and mirror used for color separation and color combination become larger, and the tilted projection becomes larger. Accordingly, the cost increases due to the additional lens elements needed to maintain optical performance.

It is desirable that the principal ray emitted from the four corners of the display surface I toward the projection optical system satisfy condition (7).

$$|\theta_k - \theta_o| max < 5° \quad (7)$$

where $\theta_k$ represents the angle formed by the principal rays emitted from the four corners of the element surface I and the normal line 110 of the display surface I. and $|\theta_k - \theta_o|$max represents the maximum value of $|\theta_k - \theta_o|$ of the principal rays as there are four angles, $\theta k_1$, $\theta k_2$, $\theta k_3$ and $\theta k_4$ for a rectangular display surface I. It should be noted that all of the rays emitted from the four corners are not at the same angle $\theta_k$ because the projection optical system is tilted relative to the display surface.

In each of the aforesaid embodiments, the light is inclined as it enters the display surface I. Accordingly, when the principal ray is outside the condition range of condition (7), a large amount of trapezoidal distortion is generated. To correct this distortion requires many decentering lens elements, which increases the amount of decentering. These additional lens elements increase the manufacturing costs.

It is desirable that a lens (the lens element having surfaces S9 and S10) having negative optical power is disposed adjacent to the diaphragm on the display surface side. According to this construction, it is possible the rays between the decentering optical element DL and the display surface I are telecentric. For this reason, it is possible to minimize the color irregularity generated by color separation and color combination by the cross dichroic prism, so as to attain excellent color reproduction in the projection image.

It is desirable that a lens (the lens element having surfaces S15 and S16) having positive optical power is disposed in proximity to the display. According to this construction, it is unnecessary for the rays to be telecentric between the decentering optical element DL and the positive optical power lens near the display element. For this reason, the overall lens length can be reduced even when the spacing is increased, thereby obtaining a compact projection optical system.

It is desirable that the optical power of the positive lens disposed in proximity to the display element satisfies condition (8).

$$0.05 < -Pc \times Si \times \beta < 0.4 \tag{8}$$

where Pc represents the optical power of the positive lens disposed near the display.

When the lower limit of condition (8) is not met, the telecentric effect is weakened between the decentering optical element DL and the positive optical power lens in proximity to the display surface I, and increasing the distance therebetween increases the overall length of the lens. When the upper limit of condition (8) is exceeded, the illumination light pupil position is too close to the display surface I, such that the angle must be increased to separate the illumination light and the projection light. For this reason, in order to correct aberration caused by the inclined projection, the number of lens elements and the amount of decentering must be increased, thereby increasing costs.

The construction of the projection display apparatus of the present invention is described below by way of specific examples via construction data, spot diagrams and the like of the projection optical system.

In the construction data of the projection optical system of the various embodiments, Si (i=1,2,3 . . . ) represents the No. i surface counting from the projection image surface side (S0; screen surface), and ri (i=0,1,2,3 . . . ) represents the radius of curvature of the surface Si in a system including the decentering standard surface (SI; without optical effect) and the display surface I. Furthermore, di (i=0,1,2,3 . . . ) represents the axial distance of the No. i surface counting from the projection image surface (S0) side. Ni (i=1,2,3 . . . ) and vi (i=1,2,3 . . . ) respectively represent the refraction index (Nd) and Abbe number (d) relative to the d-line of the No. i optical element counting from the projection image surface (S0) side. Since the illumination optical system jointly uses part of the projection optical system, these construction data are omitted.

In the orthogonal coordinate system (X,Y,Z), the center position of the decentering standard surface SI is the surface peak coordinate (XDE,YDE,ZDE)=(parallel decentering position in the X direction, parallel decentering position in the Y direction, parallel decentering position in the Z direction) designated the origin (0,0,0), and expresses both the position of the lead parallel decentering surface and rotational decentering (the counterclockwise direction facing this sheet is designated positive) at a rotation angle ADE (°) around the X-axis as the center of the surface peak of that surface. The X-axis direction is a direction perpendicular to the sheet surface (the back surface direction of the sheet is designated positive), the Y-axis direction is a linear direction intersecting the decentering standard surface S1 and the sheet surface (the upward direction in the drawing is designated positive), and the Z-axis direction is the normal line direction of the decentering standard surface S1 (the display surface side is designated positive).

Surfaces Si marked with an asterisk (*) represent aspherical surfaces, and are defined by equation AS below which represents the surface shape (each surface peak standard) of the aspherical surface. Aspherical surface data are included with other data.

$$Z=(c \cdot h^2)/[1+\sqrt{1-(1+K) \cdot c^2 \cdot h^2}]+(A \cdot h^4+B \cdot h^6+C \cdot h^8+D \cdot h^{10}+E \cdot h^{12}) \tag{AS}$$

where Z represents an aspherical displacement amount from a reference surface in aspherical surface along the optical axis direction, h represents a height perpendicular to the optical axis (defined by $h^2=X^2+Y^2$), c represents a curvature and K, A, B, C, D and E represent aspherical coefficients.

| Embodiment 1 projection optical system | | | |
|---|---|---|---|
| [surface] | [radius of curvature] | [axial distance] | [refractive index] | [Abbe number] |
| S0 | r0 = ∞ | | | |
| | | d0 = 845.000 | | |
| S1 | r1 = ∞ | | | |
| S2 | (XDE,YDE,ZDE,ADE) = (0.0,4.551,0.190,−1.916) | | | |
| | r2 = 53.383 | | | |
| | | d2 = 1.100 | N1 = 1.7545 | v1 = 51.570 |
| S3 | r3 = 29.413 | | | |
| | | d3 = 13.480 | | |
| S4 | r4 = 209.287 | | | |
| | | d4 = 1.557 | N2 = 1.4875 | v2 = 70.440 |
| S5* | r5 = 28.406 | | | |
| | | d5 = 53.053 | | |
| S6 | r6 = 87.096 | | | |
| | | d6 = 4.986 | N3 = 1.8195 | v3 = 25.842 |
| S7 | r7 = −450.877 | | | |
| S8 (SP)(XDE,YDE,ZDE,ADE) = (0.000,0.000,120.000,0.000) | | | | |
| | r8 = ∞ (effective radius: 11.359) | | | |
| S9 (XDE,YDE,ZDE,ADE) = (0.000,2.440,123.000,0.977) | | | | |
| | r9 = −391.745 | | | |
| | | d9 = 10.000 | N4 = 1.8473 | v4 = 25.736 |
| S10 | r10 = 47.089 | | | |
| | | d10 = 0.100 | | |
| S11* | r11 = 41.324 | | | |
| | | d11 = 7.106 | N5 = 1.5139 | v5 = 66.880 |
| S12 | r12 = −50.378 | | | |
| S13* (XDE,YDE,ZDE,ADE) = (0.000,11.125,204.808,2.827) | | | | |
| | r13 = 269.577 | | | |
| | | d11 = 16.679 | N6 = 1.5168 | v6 = 65.261 |
| S14* | r14 = −51.560 | | | |
| S15 (XDE,YDE,ZDE,ADE) = (0.000,11.997,222.465,−4.759) | | | | |
| | r15 = ∞ | | | |
| | | d15 = 90.000 | N7 = 1.5168 | v7 = 65.261 |
| S16 | r16 = ∞ | | | |
| S17(I) (XDE,YDE,ZDE,ADE) = (0.000,4.447,313.152,−2.455) | | | | |
| | r17 = ∞ | | | |

Aspherical Data of the fifth surface (S5)

K = −0.983596
A = −0.941346 × 10⁻⁶
B = −0.382769 × 10⁻⁸
C = 0.361847 × 10⁻¹¹
D = −0.479956 × 10⁻¹⁴

Aspherical Data of the eleventh surface (S11)

K = 0.000000
A = −0.180239 × 10⁻⁵
B = −0.869663 × 10⁻⁸
C = 0.650313 × 10⁻¹⁰
D = −0.225062 × 10⁻¹²
E = 0.294746 × 10⁻¹⁵

-continued

Embodiment 1 projection optical system

Aspherical Data of the thirteenth surface (S13)

K = 0.000000
A = 0.910200 × $10^{-7}$
B = −0.374901 × $10^{-9}$
C = 0.319043 × $10^{-12}$
D = −0.452650 × $10^{-16}$
E = −0.175222 × $10^{-19}$

Aspherical Data of the fourteenth surface (S14)

K = 0.000000
A = 0.144980 × $10^{-5}$
B = −0.146171 × $10^{-9}$
C = 0.124804 × $10^{-12}$
D = 0.116210 × $10^{-15}$
E = −0.412338 × $10^{-19}$

Embodiment 2 projection optical system

| [surface] | [radius of curvature] | [axial distance] | [refractive index] | [Abbe number] |
|---|---|---|---|---|
| S0 | r0 = ∞ | | | |
| | | d0 = 845.000 | | |
| S1 | r1 = ∞ | | | |
| S2 | (XDE,YDE,ZDE,ADE) = (0.000,13.027,0.100,2.593) | | | |
| | r2 = 103.355 | | | |
| | | d2 = 1.500 | N1 = 1.6958 | ν1 = 53.789 |
| S3 | r3 = 44.929 | | | |
| | | d3 = 16.377 | | |
| S4 | r4 = 162.886 | | | |
| | | d4 = 15.000 | N2 = 1.4875 | ν2 = 70.440 |
| S5* | r5 = 46.791 | | | |
| S6 | (XDE,YDE,ZDE,ADE) = (0.000,0.312,179.525,−1.277) | | | |
| | r6 = 69.314 | | | |
| | | d6 = 4.067 | N3 = 1.7985 | ν3 = 22.600 |
| S7 | r7 = 265.314 | | | |
| | | d7 = 21.594 | | |
| S8(SP) | r8 = ∞(effective radius = 16.018) | | | |
| | | d8 = 10.561 | | |
| S9 | r9 = −83.217 | | | |
| | | d9 = 15.000 | N4 = 1.8267 | ν4 = 24.179 |
| S10 | r10 = 68.657 | | | |
| | | d10 = 0.100 | | |
| S11* | r11 = 59.816 | | | |
| | | d11 = 15.000 | N5 = 1.6543 | ν5 = 55.745 |
| S12 | r12 = −63.017 | | | |
| S13 | (XDE,YDE,ZDE,ADE) = (0.000,18.067,248.261,−7.984) | | | |
| | r13 = 127.713 | | | |
| | | d11 = 6.809 | N6 = 1.5168 | ν6 = 65.261 |
| S14 | r14 = 746.072 | | | |
| | | d14 = 110.000 | | |
| S15 | r15 = 58.547 | | | |
| | | d15 = 15.000 | N7 = 1.7545 | ν7 = 51.570 |
| S16 | r16 = 101.156 | | | |
| | | d16 = 3.000 | | |
| S17(I) | r17 = ∞ | | | |

Aspherical Data of the fifth surface (S5)

K = −0.800000
A = −0.956207 × $10^{-6}$
B = −0.236775 × $10^{-9}$
C = −0.968458 × $10^{-13}$
D = −0.418944 × $10^{-16}$

Aspherical Data of the eleventh surface (S11)

K = 0.000000
A = −0.102161 × $10^{-5}$
B = −0.285814 × $10^{-8}$
C = 0.131048 × $10^{-10}$
D = −0.256918 × $10^{-13}$
E = 0.190853 × $10^{-16}$

Embodiment 3 projection optical system

| [surface] | [radius of curvature] | [axial distance] | [refractive index] | [Abbe number] |
|---|---|---|---|---|
| S0 | r0 = ∞ | | | |
| | | d0 = 845.000 | | |
| S1 | r1 = ∞ | | | |
| S2 | (XDE,YDE,ZDE,ADE) = (0.000,10.734,0.100,1.192) | | | |
| | r2 = 64.918 | | | |
| | | d2 = 1.600 | N1 = 1.7545 | ν1 = 51.570 |
| S3 | r3 = 37.730 | | | |
| | | d3 = 14.893 | | |
| S4 | r4 = 119.934 | | | |
| | | d4 = 7.302 | N2 = 1.4875 | ν2 = 70.440 |
| S5* | r5 = 31.045 | | | |
| S6 | (XDE,YDE,ZDE,ADE) = (0.000,−2.308,177.602,0.426) | | | |
| | r6 = 60.731 | | | |
| | | d6 = 8.370 | N3 = 1.6723 | ν3 = 28.247 |
| S7 | r7 = −1247.768 | | | |
| S8(SP) | (XDE,YDE,ZDE,ADE) = (0.000,0.000,205.186,0.000) | | | |
| | r8 = ∞(effective radius = 17.312) | | | |
| S9 | (XDE,YDE,ZDE,ADE) = (0.000,−2.027,208.186,0.572) | | | |
| | r9 = −99.624 | | | |
| | | d9 = 15.000 | N4 = 1.8068 | ν4 = 25.248 |
| S10 | r10 = 49.796 | | | |
| | | d10 = 0.100 | | |
| S11* | r11 = 45.425 | | | |
| | | d11 = 14.079 | N5 = 1.5502 | ν5 = 63.013 |
| S12 | r12 = −69.877 | | | |
| S13 | (XDE,YDE,ZDE,ADE) = (0.000,20.537,237.241,−3.369) | | | |
| | r13 = 138.420 | | | |
| | | d11 = 8.985 | N6 = 1.5168 | ν6 = 65.261 |
| S14 | r14 = −830.085 | | | |
| S15 | (XDE,YDE,ZDE,ADE) = (0.000,3.561,355.433,−6.760) | | | |
| | r15 = 77.998 | | | |
| | | d15 = 5.252 | N7 = 1.4875 | ν7 = 70.440 |
| S16 | r16 = ∞ | | | |
| S17(I) | (XDE,YDE,ZDE,ADE) = (0.000,2.825,361.641,−8.225) | | | |
| | r17 = ∞ | | | |

Aspherical Data of the fifth surface (S5)

K = −0.800000
A = −0.688237 × $10^{-6}$
B = −0.836011 × $10^{-9}$
C = −0.171182 × $10^{-13}$
D = −0.514561 × $10^{-15}$

Aspherical Data of the eleventh surface (S11)

K = 0.000000
A = −0.146304 × $10^{-5}$
B = −0.179349 × $10^{-8}$
C = 0.927093 × $10^{-11}$
D = −0.201469 × $10^{-13}$
E = 0.163826 × $10^{-16}$

Figure 3:
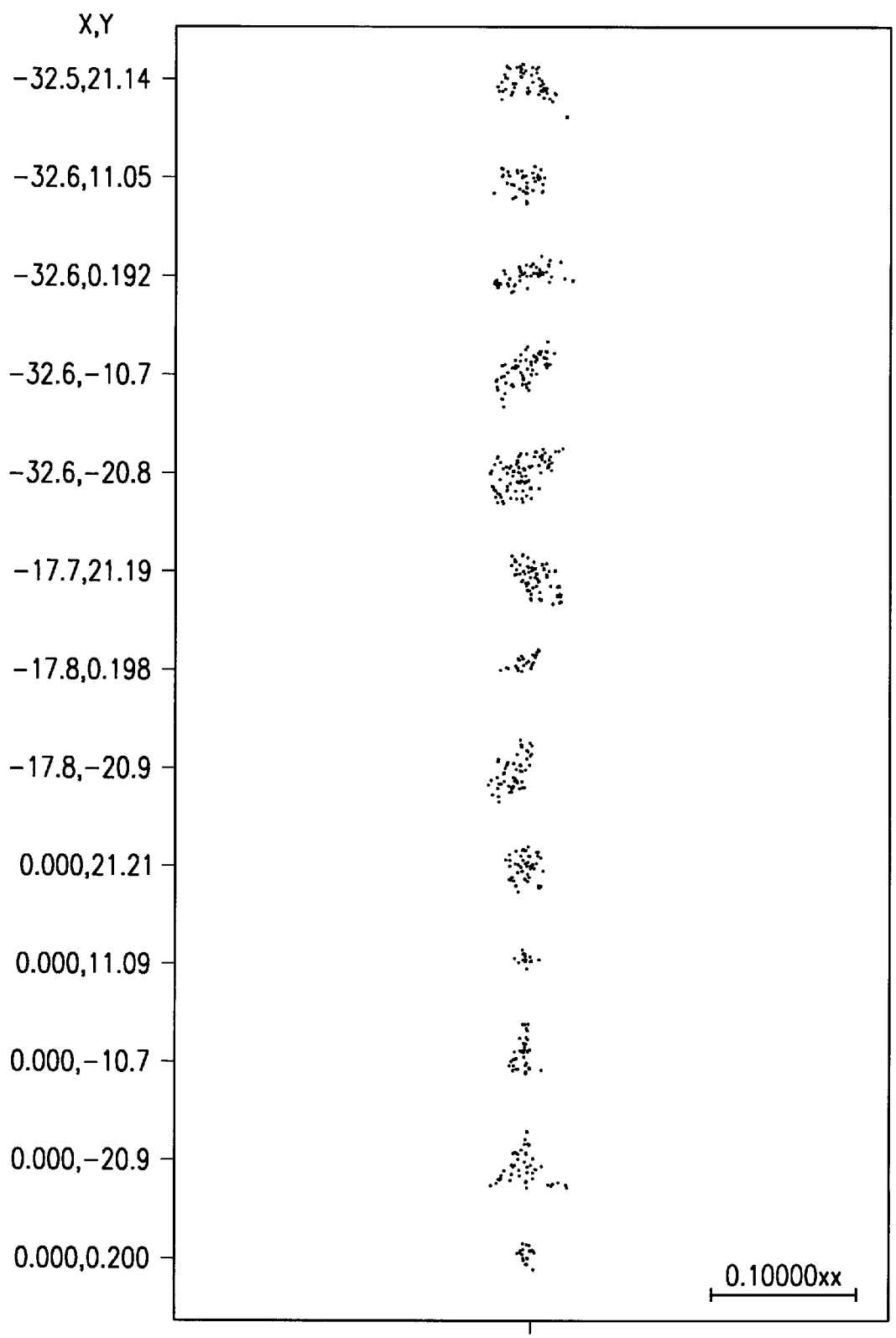
FIG. 3 is a spot diagram of the projection optical system of the first embodiment.
Figure 4:
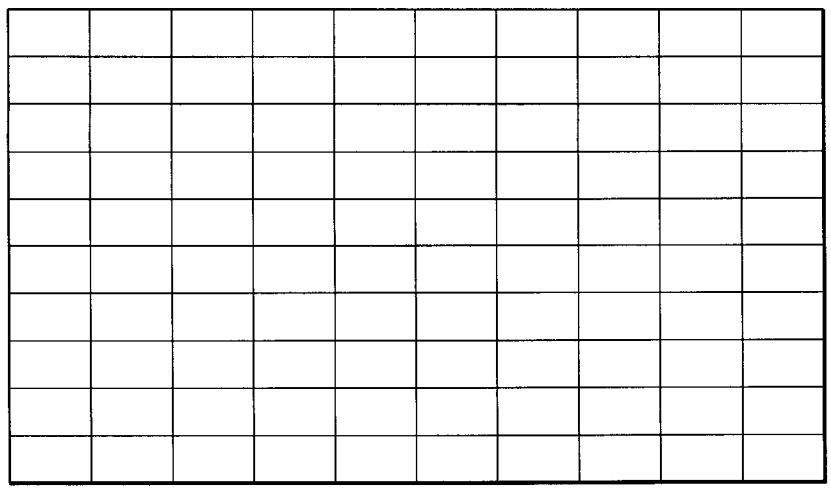
FIG. 4 is a distortion diagram of the projection optical system of the first embodiment.
Figure 8:
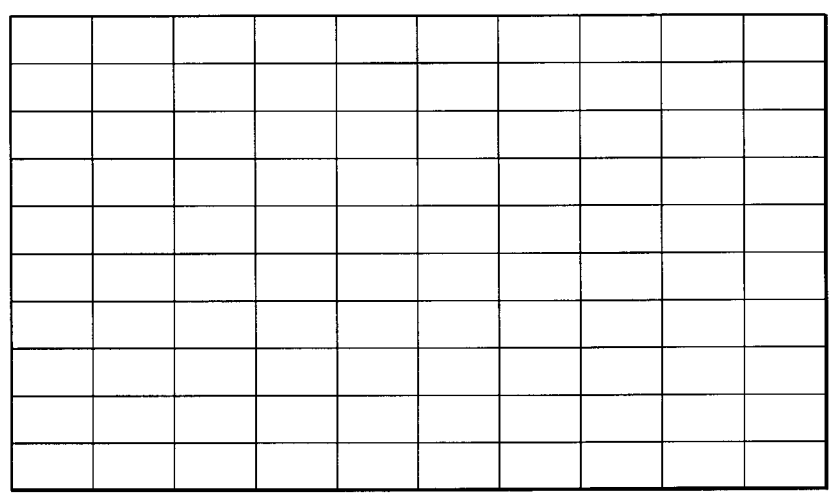
FIG. 8 is a distortion diagram of the projection optical system of the second embodiment.
Figure 12:
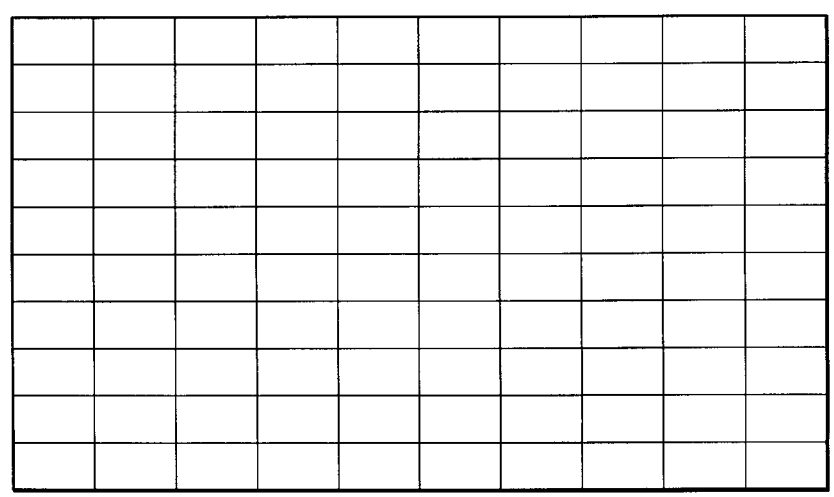
FIG. 12 is a distortion diagram of the projection optical system of the third embodiment.
Figure 7:
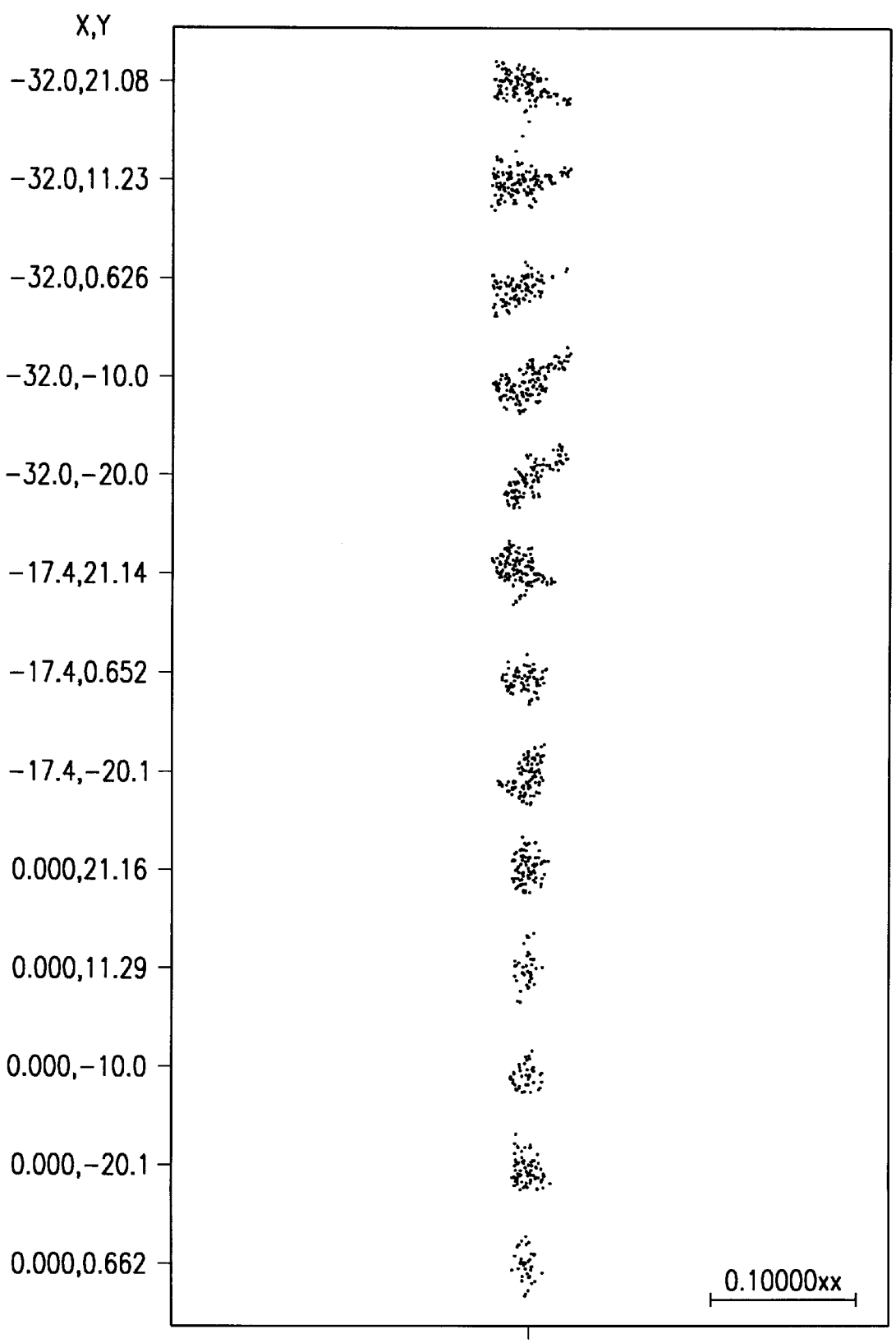
FIG. 7 is a spot diagram of the projection optical system of the second embodiment.
Figure 11:
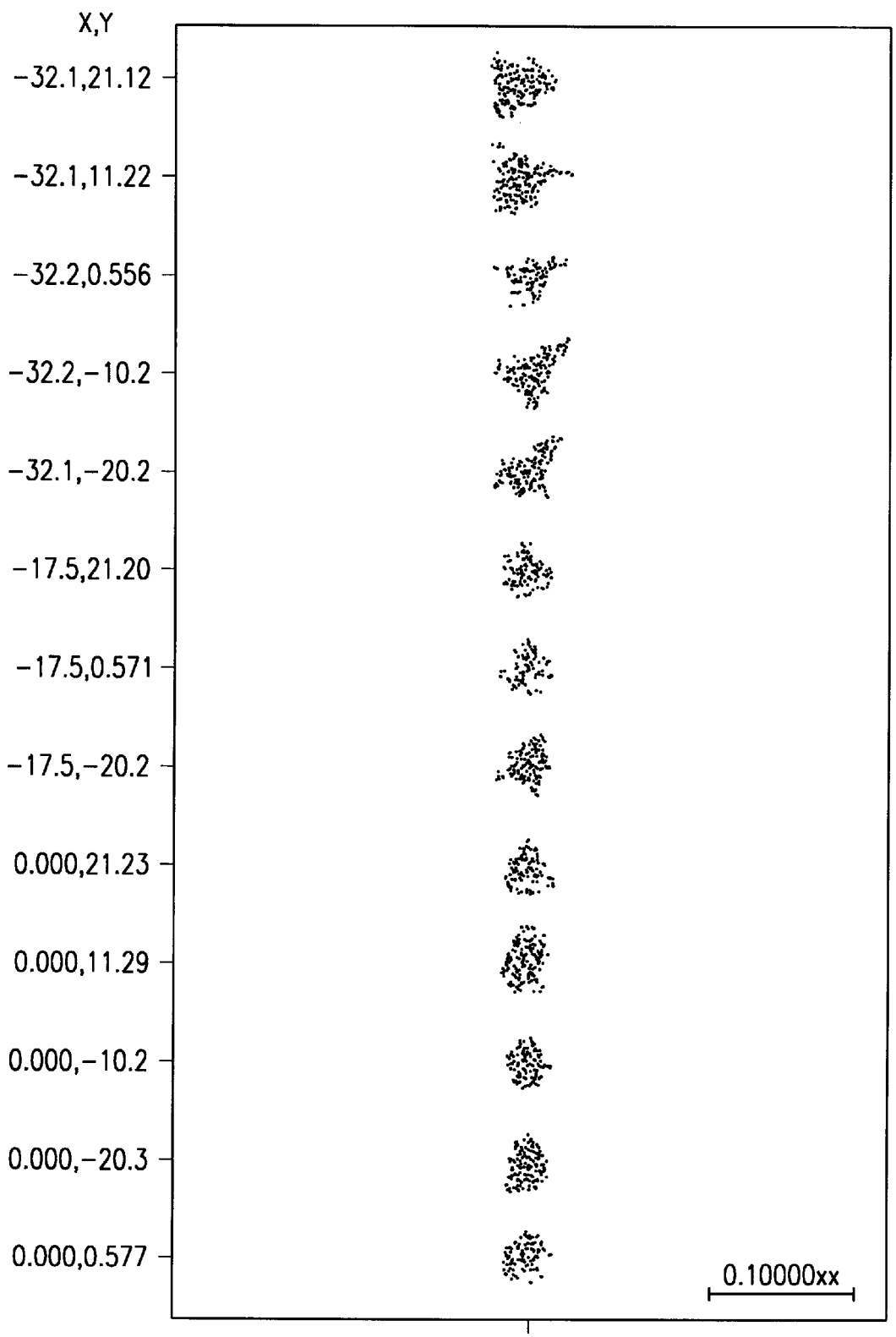
FIG. 11 is a spot diagram of the projection optical system of the third embodiment.
Figure 13:
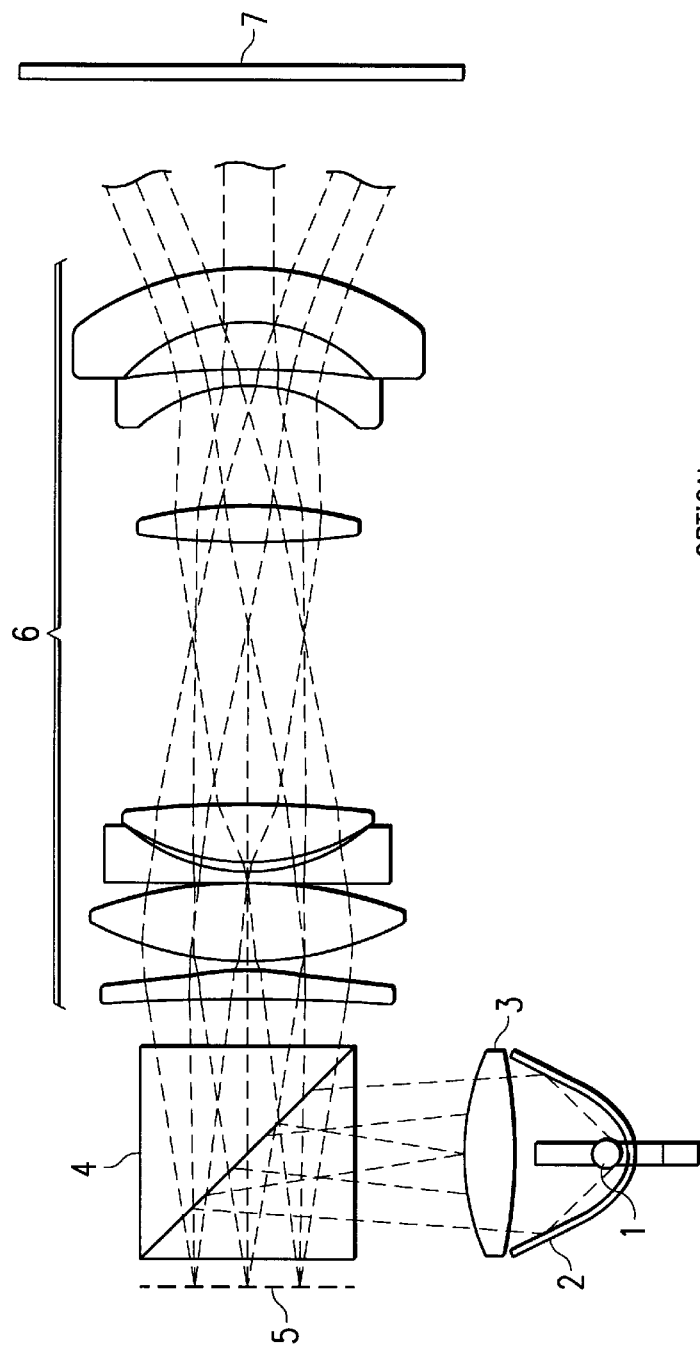
FIG. 13 shows the construction of a conventional example of a single-panel projection display apparatus.

The optical performance of the projection optical system of each embodiment is shown in spot diagrams (FIGS. 3, 7, 11), and aberration diagrams (FIGS. 4, 8, 12). The evaluation fields were (566.0 mm in the X-axis direction and (340.0 mm in the Y-axis direction on the screen surface S0, and each evaluation position is represented by coordinates (X,Y) in Table. In essence, the screen surface S0 is the projection image surface, and the display element surface I is the object surface, but in the present embodiments, the screen surface S0 is regarded as the object surface, and the display element surface I is evaluated for optical performance as a condensed system of optical statistics.

The following table shows values corresponding to the conditional equations of each of the embodiments.

TABLE

| Embodiments | Cond. (1) $\theta_i$ | Cond. (2) $\theta_o$ | Cond. (3) -Hn/Hf | Cond. (4) k/Ls | Cond. (5) -Ph$_x$Si$_x\beta$ | Cond. (6) $\theta_p$ | Cond. (7) $|\theta_k-\theta_o|$ max | Cond. (8) -Pc$_x$Si$_x\beta$ |
|---|---|---|---|---|---|---|---|---|
| 1 | 0.200 | 10.310 | 0.241 | 3.9 | 0.3395 | 15.83 | 0.668 | — |
| 2 | 0.662 | 10.274 | −0.013 | 4.8 | 0.0963 | 7.63 | 0.356 | 0.1789 |
| 3 | 0.577 | 10.463 | −0.066 | 4.7 | 0.1250 | 7.65 | 0.268 | 0.1799 |

As described above, the present invention realizes a low cost, compact, and high resolution projection display apparatus by providing a decentering optical element which becomes larger decentering between a diaphragm and a display under predetermined conditions.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A projection display apparatus comprising:
   a reflective type display for displaying a two-dimensional image on a display surface;
   a projection optical system for projecting an enlargement image of the two-dimensional image displayed on the display surface onto a projection image surface, the projection optical system having a diaphragm; and
   a decentering optical element disposed between the diaphragm and the reflective type display and decentered with respect to the diaphragm, and
   wherein the following conditions are satisfied when an image center ray is defined by a line connecting a center position of the display surface and a center position of the projection image surface;

$\theta_i < 10°$ $5° < \theta_o < 15°$ where $\theta_i$ represents an angle formed by a normal line of the projection image surface and the image center ray, and $\theta_o$ represents an angle formed by a normal line of the display surface and the image center ray.

2. A projection display apparatus as claimed in claim 1, wherein the following condition is satisfied;

$1.0 < k/Ls < 10$ where k represents the distance along the image center ray in a space filled with a continuous medium, and Ls represents the length of a short side of the display surface.

3. A projection display apparatus as claimed in claim 1, wherein the following condition is satisfied:

$2° < \theta_p < 15°$ where $\theta_p$ represents the angle formed by a tangent plane at a position at which the image center ray passes through a surface of the decentering optical element nearest the projection image surface and a tangent plane at a position at which the image center ray passes through a surface of the decentering optical element nearest the display surface.

4. A projection display apparatus as claimed in claim 1, wherein the following condition is satisfied:

$|\theta_k-\theta_o|max < 5°$ where $\theta_k$ represents the angle formed by a principal ray emitted from four corners of the display surface and a normal line of the display surface, and $|\theta_k-\theta_o|$ max represents the maximum value of $|\theta_k-\theta_o|$ of the principal ray.

5. A projection display apparatus is claimed in claim 1 having an illumination light source and wherein the following condition is satisfied:

$-0.15 < -Hn/Hf < 0.4$ where Hn represents the distance from an axis of symmetry of the decentering optical element to the position nearest the illumination light source at the projection light flux transmission position and Hf represents the distance from the axis of symmetry of the decentering optical element to the position farthest from the illumination light source at the projection light flux transmission position.

6. A projection display apparatus as claimed in claim 1, wherein the following condition is satisfied:

$0.03 < -Ph \times Si \times \beta < 0.7$ where Ph represents the positive optical power of the decentering optical element, Si represents a distance from the projection image surface to a surface nearest the projection image surface of the projection optical system and $\beta$ represents the reduction magnification in the decentering direction of the decentering optical element.

7. A projection display apparatus as claimed in claim 1, wherein the following condition is satisfied;

$0.05 < -Pc \times Si \times \beta < 0.4$ wherein Pc represents the optical power of a positive lens disposed near the display surface, Si represents the distance from the projection image surface to the surface nearest the projection image surface of the projection optical system and $\beta$ represents the reduction magnification in the decentering direction of the decentering optical element.

8. A projection display apparatus comprising:
   a reflective type display for displaying a two-dimensional image on a display surface;
   a projection optical system for projecting an enlargement image of the two-dimensional image displayed on the display surface onto a projection image surface, the projection optical system having a diaphragm;

a decentering optical element disposed between the diaphragm and the reflective type display and decentered with respect to the diaphragm; and an illumination optical system for illuminating the reflective type display and having an optical element and an illumination light source, the optical element and the decentering optical element are transmitted by an illumination light emitted from the illumination light source and a projection light reflected on the reflective type display, wherein the following conditions are satisfied when an image center ray is defined by a line connecting a center position of the display surface and a center position of the projection image surface;

$$\theta_i < 10°$$

$$5° < \theta_o < 15°$$

where $\theta_i$ represents an angle formed by a normal line of the projection image surface and the image center ray, and $\theta_o$ represents an angle formed by a normal line of the display surface and the image center ray.

9. A projection display apparatus as claimed in claim 8, wherein the following condition is satisfied;

$$1.0 < k/Ls < 10$$

where k represents the distance along the image center ray in a space filled with a continuous medium, and Ls represents the length of a short side of the display surface.

10. A projection display apparatus as claimed in claim 8, wherein the following condition is satisfied:

$$2° < \theta_p < 15°$$

where $\theta_p$ represents the angle formed by a tangent plane at a position at which the image center ray passes through a surface of the decentering optical element nearest the projection image surface and a tangent plane at a position at which the image center ray passes through a surface of the decentering optical element nearest the display surface.

11. A projection display apparatus as claimed in claim 8, wherein the following condition is satisfied;

$$|\theta_k - \theta_o| max < 5°$$

where $\theta_k$ represents the angle formed by a principal ray emitted from four corners of the display surface and a normal line of the display surface, and $|\theta_k-\theta_o|$max represents the maximum value of $|\theta_k-\theta_o|$ of the principal ray.

12. A projection display apparatus is claimed in claim 8 wherein the following condition is satisfied:

$$-0.15 < -Hn/Hf < 0.4$$

where Hn represents the distance from an axis of symmetry of the decentering optical element to the position nearest the illumination light source at the projection light flux transmission position and Hf represents the distance from the axis of symmetry of the decentering optical element to the position farthest from the illumination light source at the projection light flux transmission position.

13. A projection display apparatus as claimed in claim 8, wherein the following condition is satisfied:

$$0.03 < -Ph \times Si \times \beta < 0.7$$

where Ph represents the positive optical power of the decentering optical element, Si represents a distance from the projection image surface to a surface nearest the projection image surface of the projection optical system and $\beta$ represents the reduction magnification in the decentering direction of the decentering optical element.

14. A projection display apparatus as claimed in claim 8, wherein the following condition is satisfied;

$$0.05 < -Pc \times Si \times \beta < 0.4$$

wherein Pc represents the optical power of a positive lens disposed near the display surface, Si represents the distance from the projection image surface to the surface nearest the projection image surface of the projection optical system and $\beta$ represents the reduction magnification in the decentering direction of the decentering optical element.

* * * * *